United States Patent [19]

Rüger

[11] Patent Number: 4,576,449

[45] Date of Patent: Mar. 18, 1986

[54] SIGHTING MIRROR INCLUDING A STABILIZING DEVICE

[75] Inventor: Roderich Rüger, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 640,610

[22] Filed: Aug. 14, 1984

[30] Foreign Application Priority Data

Sep. 8, 1983 [DE] Fed. Rep. of Germany ....... 3332416

[51] Int. Cl.⁴ .............................................. G02B 27/64
[52] U.S. Cl. ..................... 350/500; 350/487
[58] Field of Search ............... 350/500, 487, 486, 632, 350/636, 637, 6.6; 358/222, 109

[56] References Cited

U.S. PATENT DOCUMENTS

| 3,634,622 | 1/1972 | Wheeler | 358/109 |
| 4,063,287 | 12/1977 | von Rosmalen | 350/6.6 |
| 4,203,654 | 5/1980 | Ellis | 350/487 |
| 4,245,254 | 1/1981 | Svensson et al. | 358/222 |
| 4,404,592 | 9/1983 | Pepin et al. | 358/109 |

FOREIGN PATENT DOCUMENTS

| 114116 | 7/1982 | Japan | 350/500 |
| 688889 | 9/1979 | U.S.S.R. | 350/6.6 |
| 48006 | 6/1980 | U.S.S.R. | 350/6.6 |

Primary Examiner—Jon W. Henry
Attorney, Agent, or Firm—W. G. Fasse; D. H. Kane, Jr.

[57] ABSTRACT

A sighting mirror, especially for sighting instruments, includes a stabilizing device for stabilizing the mirror position independently of the operating conditions, once the mirror has been trained on a target. A substantial accuracy in the stabilizing is achieved by providing a rough mirror frame stabilization and a fine mirror stabilization independently of the mirror frame stabilization. The fine stabilization is achieved by piezoelectric elements interposed between the mirror frame and the mirror which is pivotally attached to the mirror frame. A gyro provides electrical first control signals for the rough adjustment of the mirror frame, for example by a frame drive motor. The gyro also provides second control signals for the fine adjustment of the mirror by the piezoelectric elements. Movement translation may increase the effect of the piezoelectric elements.

3 Claims, 3 Drawing Figures

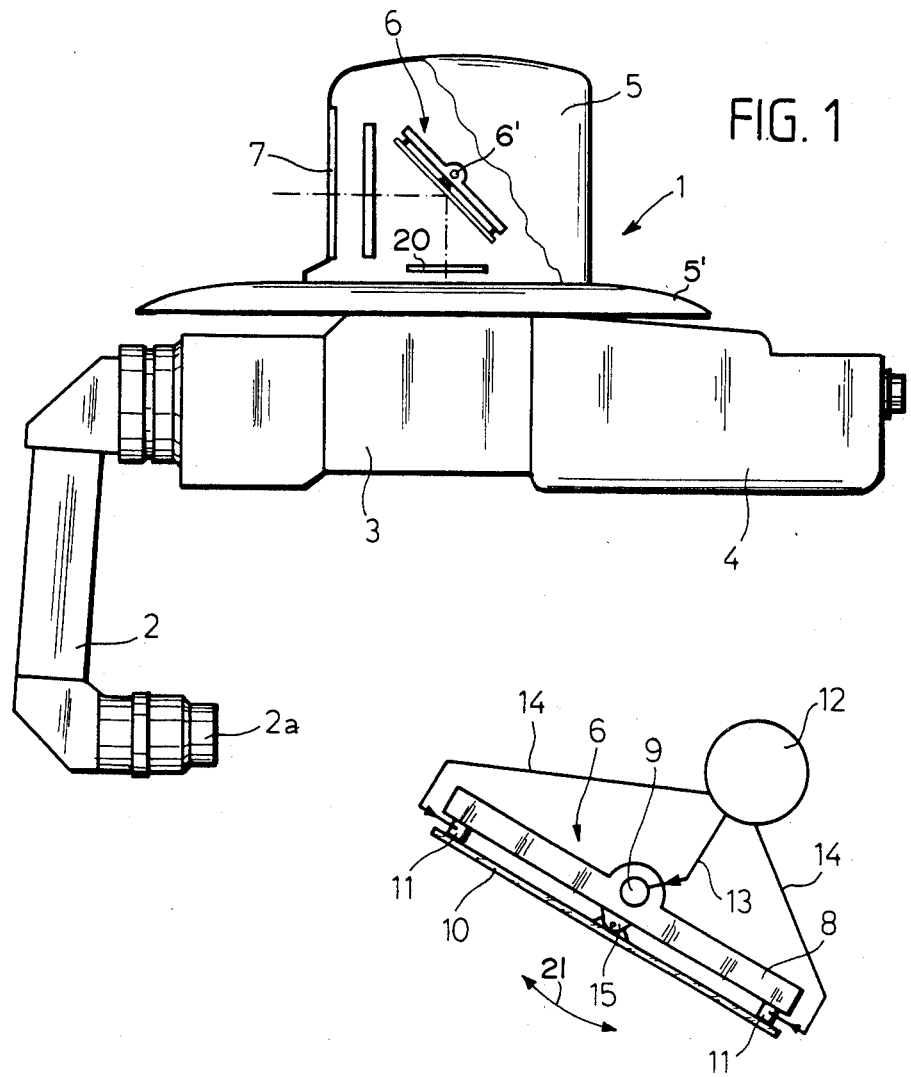
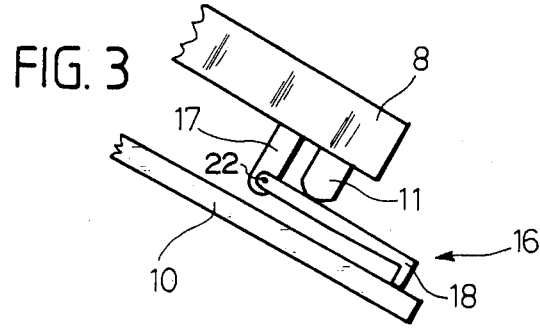

SIGHTING MIRROR INCLUDING A STABILIZING DEVICE

FIELD OF THE INVENTION

The invention relates to a sighting mirror including a stabilizing device. Such sighting mirrors are used in connection with sighting instruments, for example, in military vehicles such as a tank or on military aircraft such as a helicopter. Such mirrors are tiltable so that they may be trained on a target.

DESCRIPTION OF THE PRIOR ART

The development of small, lightweight, and inexpensive sighting systems, especially for use in aircraft and armored vehicles for the launching and observation of flying bodies has shown that stabilized mirrors are substantially more advantageous than stabilized platforms. Further, it has been found that the stabilizing of the mirror having a required edge length of about 100 to 400 mm and requiring a stabilization accuracy in the range of 10 to 100 $\mu$rad is hardly possible by direct stabilizing means, having regard to the inherent movements to which such aircraft or vehicles are subject in their operation.

OBJECTS OF THE INVENTION

In view of the above it is the aim of the invention to achieve the following objects singly or in combination:

to provide a stabilizing device for a sighting mirror of the above mentioned type which will assure very large stabilizing accuracies;

to provide the mirror stabilization independently of any vehicle or aircraft movements;

to construct the mirror and its stabilization device so that it is well suited for use under the rough operating conditions to which such vehicles or aircraft may be exposed; and to provide two mirror adjustments which are independent of each other.

SUMMARY OF THE INVENTION

The sighting mirror including its stabilizing device according to the invention comprises a mirror supporting frame for a rough stabilizing and piezoelectric elements operatively arranged between the frame and the mirror for a fine stabilization of the mirror which is pivotally attached to the frame.

It is an important advantage of the invention that the stabilizing takes place in two stages so to speak. A gyro which compensates for the inherent motions of a vehicle or aircraft provides separate control signals. First control signals are applied to a motor for rotating the frame which carries the mirror. Second control signals are applied for energizing piezoelectric elements operatively arranged between the frame and the mirror pivoted to the frame. This combination of features makes it possible that neither the mirror adjustment motor, nor the frame support require a high precision construction. Rather, these components may be constructed in a very rugged fashion with due regard to the rough environmental operating conditions to which such sighting devices are exposed. Further, the piezoelectric elements operate exactly, independently of any environmental operating conditions. Accordingly, the features of the invention assure a most exact stabilizing of sighting mirrors even when a vehicle travels over rough terrain or when an aircraft is exposed to rough flight conditions.

The operation of the piezoelectric elements may even be further improved, independently of rough operating conditions by using movement translation means for translating the expansion and contraction of the piezoelectric elements onto the mirror to be fine adjusted. These movement translation means amplify the movements of the piezoelectric elements. This feature also reduces the requirements that otherwise would have to be met by the elements for the rough adjustment of the mirror-supporting frame.

BRIEF DESCRIPTION OF THE FIGURES

In order that the invention may be clearly understood, it will now be described, by way of example, with reference to the accompanying drawings, wherein:

FIG. 1 is a sighting apparatus mounted in a rotatable turret in which the sighting mirror is installed;

FIG. 2 illustrates on an enlarged scale compared to FIG. 1, a sighting mirror with the separate control features for the rough and fine mirror position adjustment; and FIG. 3 illustrates, on an enlarged scale, motion transfer means between a piezoelectric element and the mirror to be fine adjusted.

DETAILED DESCRIPTION OF PREFERRED EXAMPLE EMBODIMENTS AND OF THE BEST MODE OF THE INVENTION

FIG. 1 illustrates schematically a sighting apparatus 1 installed, for example, in a sighting head 5 forming part of a helicopter or armored vehicle not shown, for aiming and guiding a flying body. The sighting apparatus 1 as such is known and comprises a periscope 2, a sighting housing 3, and customarily also a heat imaging device 4 secured to the housing 3. The sighting head 5 is mounted on a collar 5' to which in turn is secured the housing 3. The head 5 is rotatable about a vertical axis by conventional means not shown. A sighting mirror system 6 is operatively mounted in the sighting head 5 by pivot means 6'. Light passing through a window 7 in the sighting head 5 is deflected by the mirror system 6 onto optical means 20 of conventional construction. Conventional optical means in the housing 3 and in the periscope 2 guide the light rays to an ocular 2a.

The mirror system 6 is shown on an enlarged scale in FIG. 2 and comprises a rough adjustment frame 8 which is movable by an electrical motor 9, the rotational axis of which forms the pivot means 6' and which is supported in the sighting head 5 in a conventional manner. The mirror system 6 further comprises a mirror 10 which is pivotally connected or journalled to the frame 8 by pivot elements 15 of conventional construction. The frame 8 further carries a plurality of piezoelectric elements 11 operatively arranged between the frame 8 and the mirror 10 so that expansions and contractions of these piezoelectric elements 11 will pivot the mirror 10 back and forth about the pivot elements 15 as indicated by the double arrow 21. A gyro 12 operatively mounted in the housing 3 of the sighting system provides first and second electrical control signals for the rough and fine adjustment of the mirror system. The first control signals are supplied through an electrical conductor 13 to the electrical motor 9 for the rough adjustment of the frame 8. The second signal or signals are supplied through electrical conductors 14 to the piezoelectric elements 11 for energizing these elements to thereby perform the fine adjustment of the mirror 10. The gyro 12 is independent of any inherent movements of the vehicle or aircraft, whereby also the rough adjustment by means of the motor and the fine adjustment by means of the piezoelectric elements 11 remains independent of such movements. Thus, the gyro 12 determines the desired or predetermined position of the mirror 10.

FIG. 3 illustrates an arrangement of motion translating elements for amplifying the extremely small movements of the piezoelectric elements by a lever translation device 16 having a fixed lever member 17 secured to the frame 8 at one end thereof and carrying a second lever 18 pivotally secured to the lever 17 at one of its ends as shown at 22. The other end of the lever 18 is operatively secured to the mirror 10 and the piezoelectric element 11 is operatively secured to the lever 18 between its ends at a position determined by the desired lever advantage. As a result, the lever 18 is able to tilt the mirror by a respectively amplified angular movement in one or the other direction, depending on whether the piezoelectric element 11 expands or contracts. The pivot point remains established by the pivoting elements 15.

The invention is not intended to be limited to the described example embodiments. Rather, all types of directional mirrors may be adjusted in a highly accurate, fine manner with the aid of the piezoelectric elements arranged between the rough adjustment frame 8 and the mirror 10. Further, an enlarged translation of movement may be also accomplished by arranging other motion translation means instead of the shown lever system 16. For example, a gear teeth system could be employed for this purpose.

Although the invention has been described with reference to specific example embodiments, it will be appreciated, that it is intended to cover all modifications and equivalents within the scope of the appended claims.

What is claimed is:

1. A sighting mirror including a stabilizing device, comprising controllable drive means (9) for tilting said sighting mirror toward a target, mirror position adjustment means (12) for stabilizing a mirror position independently of operating conditions under which said sighting mirror is used, said mirror position adjustment means comprising a pivoted frame (8) for holding said sighting mirror in a roughly adjusted position in response to said controllable means (9), journal means (15) adjustably securing said sighting mirror to said pivoted frame, piezoelectric means operatively interposed between said pivoted frame and said sighting mirror for a fine adjustment of said sighting mirror relative to said frame, and wherein said mirror position adjustment means further comprise gyro means for providing electrical position control signals for said controllable drive means (9) and for said piezoelectric means, first conductor means (13) for electrically connecting said controllable drive means to said gyro means for a rough adjustment of said frame in response to said position control signals, and second conductor means (14) for electrically connecting said piezoelectric means to said gyro means for also energizing said piezoelectric means in response to said position control signals for said fine adjustment of said sighting mirror.

2. The sighting mirror of claim 1, further comprising movement translation means operatively interposed between said piezoelectric means and said sighting mirror for controlling said fine adjustment of said sighting mirror.

3. The sighting mirror of claim 2, wherein said movement translation means comprise lever means for increasing a displacement by said piezoelectric means.

* * * * *